United States Patent

[11] 3,596,821

[72] Inventors Irney Lee Rogers
1418 E. Phillips;
Donald B. Halstead, 278 Foxbury Ave.,
both of Pomona, Calif. 91766
[21] Appl. No. 824,049
[22] Filed May 13, 1969
[45] Patented Aug. 3, 1971

[54] HOPPER-TYPE FASTENER INFEED DEVICE FOR FASTENER-DRIVING TOOLS
16 Claims, 14 Drawing Figs.

[52] U.S. Cl. .................................................. 227/138,
227/112, 227/114
[51] Int. Cl. .................................................. B25c 1/00
[50] Field of Search ................................. 227/107,
112, 113, 114, 115, 116, 117, 118, 119, 138, 139,
131

[56] References Cited
UNITED STATES PATENTS

| 527,985 | 10/1894 | Hoofnagle | 227/113 |
| 650,600 | 5/1900 | Dalpe | 227/118 |
| 1,146,105 | 7/1915 | Sabelman | 227/139 |
| 2,976,538 | 3/1961 | Kamborian | 227/112 |
| 3,067,423 | 12/1962 | Swanson | 227/113 |
| 3,086,207 | 4/1963 | Lingle et al. | 227/130 |
| 3,298,585 | 1/1967 | Mohrke et al. | 227/112 |

*Primary Examiner*—Granville Y. Custer, Jr.
*Attorney*—Boniard I. Brown

ABSTRACT: An infeed device for feeding fasteners, such as nails, to a fastener-driving tool. The infeed device has a guide for attachment to the front end of the tool body, a hopper for containing a bulk quantity of loose unattached fasteners to be driven, and an infeed chute through which the fasteners move under the action of gravity from the hopper into a bore within the infeed guide. This guide is coaxially aligned with the tool-driving spindle to receive the latter during each driving stroke and is equipped with means for locating each fastener in a fixed driving position wherein the fastener is disposed to be engaged and driven forwardly into a workpiece by the tool spindle during each driving stroke of the spindle. The hopper is uniquely constructed and arranged and equipped with novel pneumatic means for inducing passage of the bulk fasteners from the hopper into the feed chute without jamming.

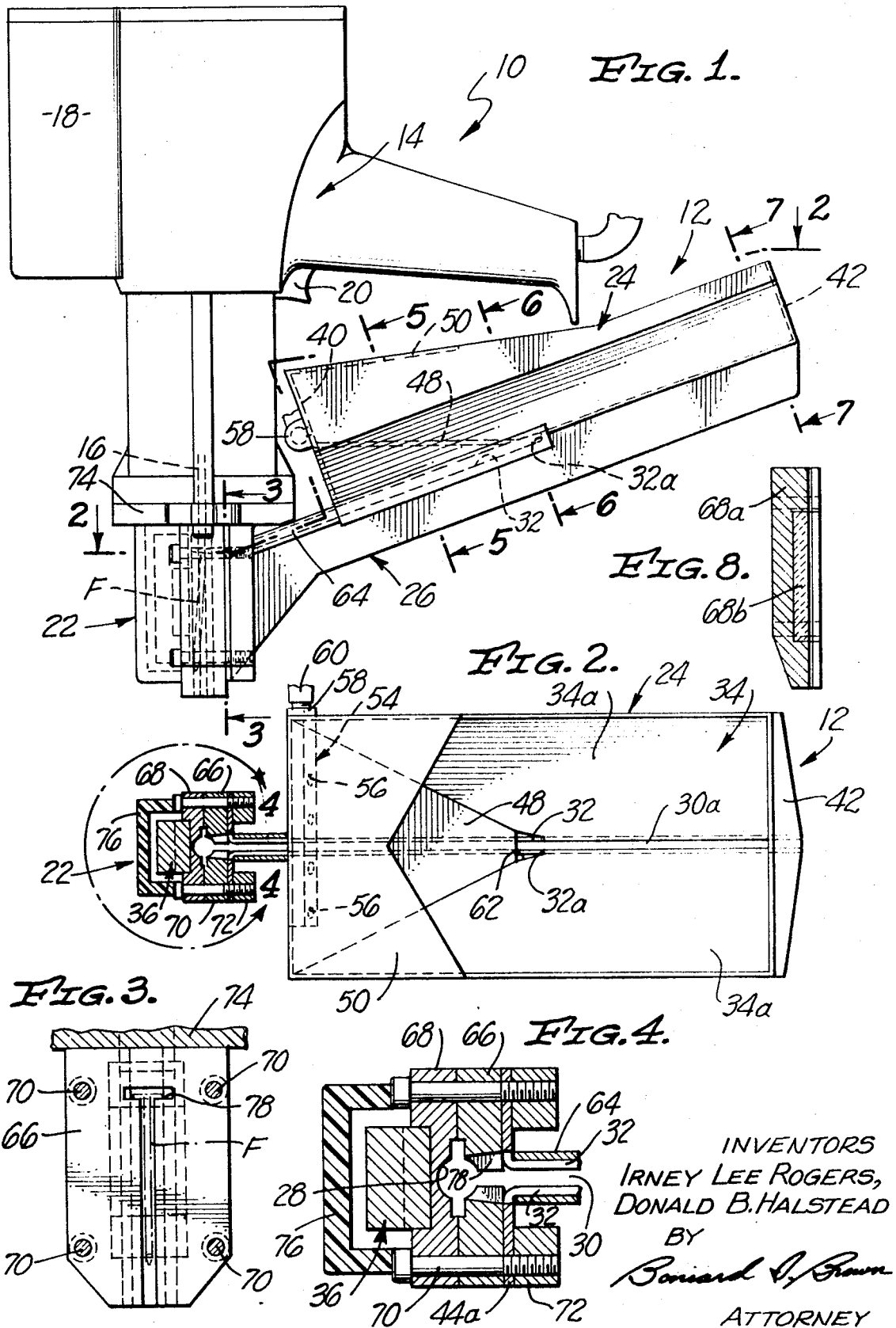

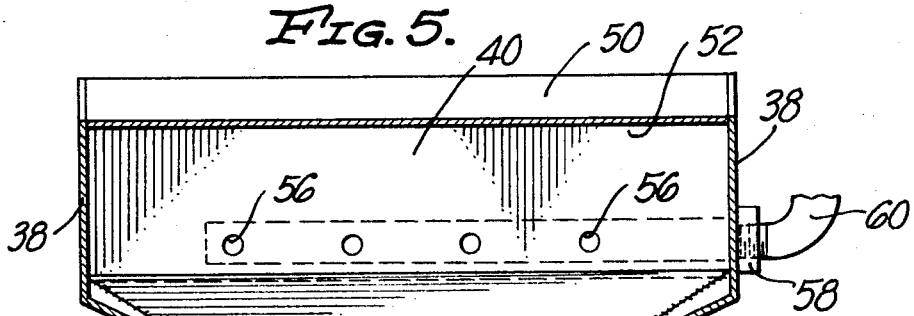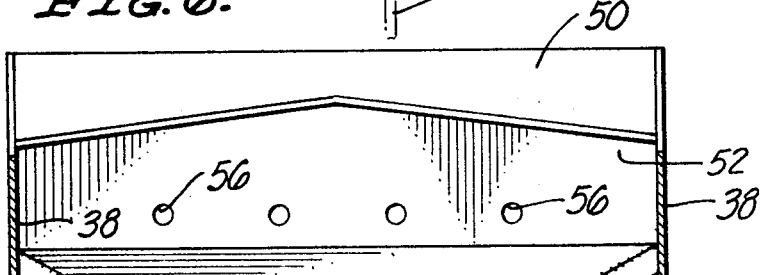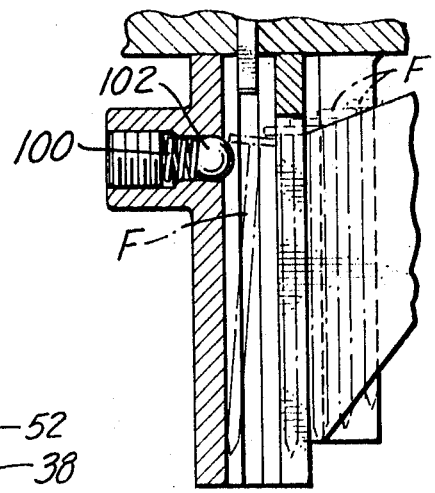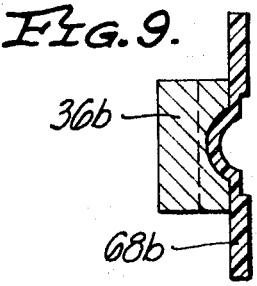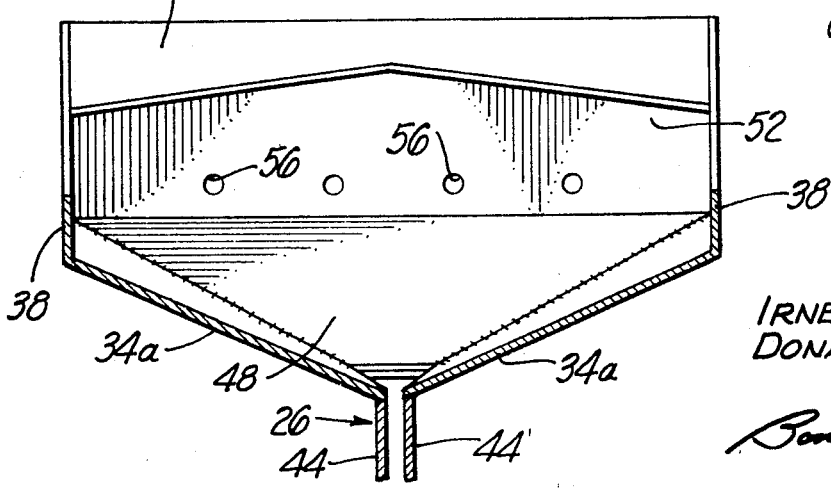

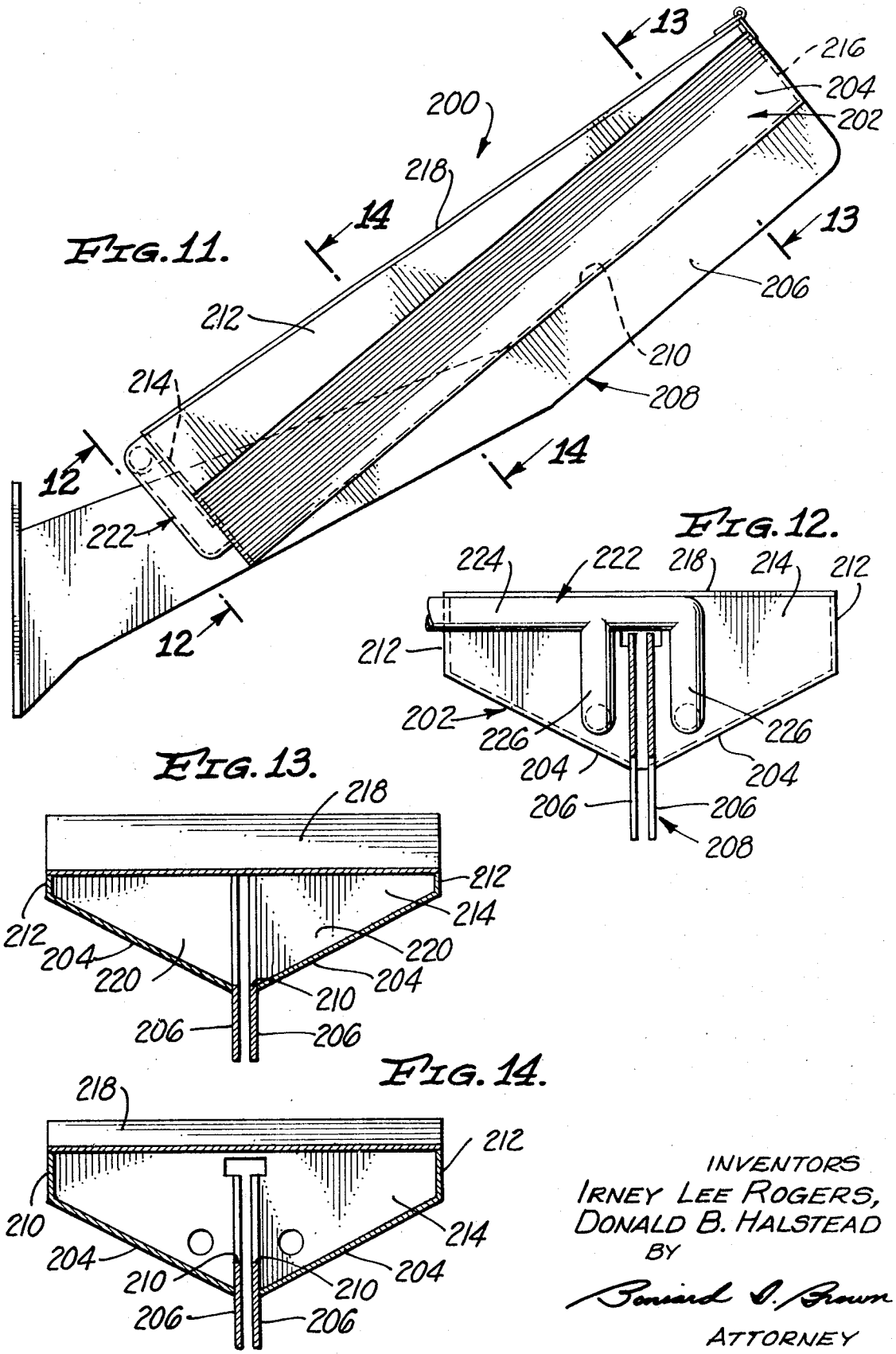

HOPPER-TYPE FASTENER INFEED DEVICE FOR FASTENER-DRIVING TOOLS

BACKGROUND OF THE INVENTION

1. Field of the Invention

This invention relates generally to power-actuated tools for driving fasteners such as nails, and the like. More particularly, the invention relates to a novel fastener infeed device for tools of this class.

2. Prior Art

As will appear from the ensuing description, the features of the present invention may be embodied in an infeed device for feeding various types of fasteners to an appropriate power-driven fastener-driving tool. For example, the present infeed device may be adapted for feeding screws to a power-driven screw-driving tool. However, the invention is primarily concerned with the driving of nails and will be disclosed in connection with its use on a nail-driving tool.

Pneumatic nail-driving tools are known in the art. A typical pneumatic nail driver comprises a driving tool proper including a nail-driving spindle, and means for driving the spindle in a reciprocating nail-driving motion involving alternate forward driving and rearward return strokes of the spindle relative to the tool body. Some type of infeed device is mounted on the front end of the tool body for feeding the nails to be driven in succession to a driving position in front of the tool spindle. In this driving position, each nail is located to be engaged by the tool spindle during its forward driving stroke, in a manner such that the nail is driven forwardly by the spindle into the workpiece.

A variety of nail infeed devices have been devised for power-driven nail-driving tools of this type. The existing infeed devices, however, are characterized by various deficiencies which need not be treated in detail here. Suffice it to say that one of the outstanding disadvantages of many infeed devices resides in their inability to handle loose or unattached nails, that is, nails which are handled in bulk fashion. This particular deficiency and the other deficiencies of the existing nail drivers detracts from their usefulness and has prevented widespread acceptance of such tools.

SUMMARY OF THE INVENTION

The present invention provides an improved fastener infeed device for fastener-driving tools of the class described. One outstanding advantage of the present infeed device resides in its ability to handle loose or unattached fasteners, such as nails, which are commonly supplied in bulk quantities. The present infeed device is characterized by an infeed guide to be attached to the front end of the fastener driving tool, a hopper for containing a bulk quantity of the loose unattached fasteners to be driven, and a feed chute extending between the hopper and the infeed guide for conveying the fasteners in succession from the hopper to the guide. Extending through the infeed guide is a bore coaxially aligned with the tool spindle, in a manner such that the spindle extends forwardly through the bore during its forward driving stroke and retracts rearwardly through the bore during its rearward return stroke.

The hopper and feed chute are uniquely constructed and arranged to effect movement of the fasteners in succession, under the action of gravity, from the hopper, through the chute, to the infeed guide. To this end, the infeed chute contains an infeed guideway which is bounded along its longitudinal sides by shoulders and has an infeed end opening laterally upward through the bottom wall of the hopper. This bottom wall has a generally funnel shape which induces passage of the fasteners from the hopper to the infeed end of the infeed guideway and entry of the fasteners, shank first, into the guideway to positions wherein the heads of the fasteners rest on the longitudinal guideway shoulders. In the normal upright driving position of the fastener-driving tool, these shoulders slope downwardly in the direction of the infeed guide, whereby the fasteners slide downwardly along the shoulders, under the action of gravity, into the bore within the infeed guide. As each fastener enters this bore, it is caused to assume a proper driving position in the bore, wherein the head of the fastener is engaged by the tool spindle during its forward driving stroke. The spindle drives the fastener forwardly from the guide bore into the workpiece.

A particularly unique and important feature of the invention resides in the fact that the fastener hopper has a forward, rearwardly opening binlike chamber into which the fasteners within the hopper tend to migrate under the action of gravity. Within the front end of this chamber are pneumatic means for periodically blowing the fasteners rearwardly from the chamber to the rear end of the hopper, from which a number of the fasteners drop shank first into the infeed guideway. This method of handling the fasteners assures a smooth and continuous transfer of fasteners from the hopper to the driving tool. In the disclosed embodiment of the invention, the fastener-driving tool is a pneumatic nail driver having an air exhaust port through which air under pressure exhausts during each operating cycle of the tool. The pneumatic means within the nail hopper communicates to this exhaust port. Accordingly, once during each driving cycle of the tool, air under pressure is supplied to the pneumatic means of the hopper to blow fasteners, in this instance nails, from the front pocket or chamber of the hopper to the rear end of the hopper for entrance into the infeed guide.

Another important aspect of the invention is concerned with the means for locating each fastener in fixed driving position within the bore of the infeed guide. In one disclosed embodiment of the invention, for example, this fastener-locating means comprises a magnet along the side of the infeed guide bore opposite the infeed chute. This magnet attracts the head and tip of each fastener entering the bore to the adjacent side of the bore, thus to position the fastener in proper driving relation to the tool spindle. In another disclosed embodiment of the invention, the fastener-locating means comprises a spring-loaded detent which engages the head of each entering fastener in such a way that the tip of the fastener rotates into engagement with the adjacent sidewall of the infeed guide bore, again to properly position the fastener in driving relation to the tool spindle.

Another feature of the invention is concerned with effecting movement of the fasteners in succession from the hopper to the infeed guide, with the adjacent fasteners in contact with one another and in a manner such that the tool spindle engages and thereby drives only the leading fastener in the incoming row of fasteners. To this end, the fastener-supporting shoulders of the infeed chute are stepped in such a way that the fasteners assume a generally staggered arrangement with the head of each fastener overlapping the head of the preceding fastener. In this way, the driving spindle of the tool is permitted to engage the head of and drive each fastener forwardly without interference from the following fastener.

BRIEF DESCRIPTION OF THE DRAWINGS

FIG. 1 is a side elevation of a fastener-driving tool, in this instance a nail driver, embodying an improved fastener infeed device according to the invention;

FIG. 2 is a section taken on line 2-2 in FIG. 1;

FIG. 3 is a section taken on line 3-3 in FIG. 1;

FIG. 4 is an enlargement of the area encircled by the arrow 4-4 in FIG. 2;

FIG. 5 is an enlarged section taken on line 5-5 in FIG. 1;

FIG. 6 is an enlarged section taken on line 6-6 in FIG. 1;

FIG. 7 is an enlarged section taken on line 7-7 in FIG. 1;

FIG. 8 illustrates a modification of the invention;

FIG. 9 illustrates a further modification of the invention;

FIG. 10 illustrates a further modification of the invention;

FIG. 11 is an enlarged side elevation of a portion of a modified fastener infeed device according to the invention;

FIG. 12 is an enlarged section taken on line 12-12 in FIG. 11;

FIG. 13 is an enlarged section taken on line 13—13 in FIG. 11; and

FIG. 14 is an enlarged section taken on line 14—14 in FIG. 11.

DESCRIPTION OF THE PREFERRED EMBODIMENT

Turning first to FIGS. 1 through 8 of these drawings, there is illustrated a fastener-driving tool 10 embodying an improved fastener infeed device 12 according to the invention. The particular tool illustrated is a nail-driving tool having a body 14 mounting a forward driving spindle 16. Within the rear end of the tool body 14 are pneumatic means 18, operated by a trigger 20 on the tool body, for driving the spindle 16 in a reciprocating fastener driving motion. This driving motion involves alternate forward driving and rearward return strokes of the spindle relative to the tool body 14. In a typical driving tool of this type, for example, each depression of the trigger 20 effects driving of the spindle 16 from its rearward limiting position to its forward limiting position and back to its rearward limiting position. For reasons which will appear presently, the tool spindle 16 is a generally flat metal bar of rectangular shape in transverse cross section.

The present fastener infeed device 12 includes an infeed guide 22, a hopper 24, and a feed chute 26 extending between and joined to the guide and hopper. The infeed guide 22 has a bore 28 and is secured to the front end of the tool body 14 in a position wherein the bore is coaxially aligned with the tool-driving spindle 16. In this position, the infeed guide bore 28 is located so that the tool spindle 16 extends forwardly through the bore during its forward driving stroke and retracts rearwardly through the bore during its rearward return stroke.

The fastener infeed chute 26 contains a longitudinal guideway 30 bounded along its longitudinal sides by fastener head-engaging shoulders 32. The infeed guideway 30 has an infeed end which opens laterally upward through the bottom wall 34 of the hopper 24, as may be best observed in FIGS. 2, 6 and 7. The guideway has an opposite outfeed or exit end which opens longitudinally through one side of the infeed guide bore 28, as best shown in FIG. 4. As will appear from the ensuing description, the bottom wall 34 of the infeed hopper 24 has a generally funnellike configuration which induces movement of fasteners in the hopper toward and entry of the fasteners into the infeed end of the infeed guideway 30. Each fastener enters the guideway, shank first, to a position wherein the head of the fastener rests on the longitudinal guideway shoulders 32, in the manner illustrated in FIG. 5. In the normal upright driving position of the fastener-driving tool 10, the guideway shoulders 32 slope downwardly in the direction of the infeed guide 22, whereby the fasteners slide downwardly along these shoulders into the guideway bore 28.

Carried by the infeed guide 22 are means 36 for locating each fastener F entering the guideway bore 28 in a fixed driving position within the bore. In this driving position, the head of the fastener is disposed for engagement by the tool-driving spindle 16 during its forward driving stroke through the bore. The lower tip of the fastener is retained in contact with the side wall of the guideway bore. In the particular inventive embodiment under discussion, the fastener-locating means 36 comprises a permanent magnet mounted within the body of the infeed guide 22, adjacent the side of the guideway bore 28 opposite the fastener infeed chute 26.

Referring now in more detail to the drawings, the fastener infeed hopper 24 has sidewalls 38 and front and rear end walls 40 and 42 joined to and rising from the side, front, and rear edges, respectively, of the bottom hopper wall 34. This bottom wall is composed of two rectangular wall portions or plates 34a located at opposite sides of the infeed chute 26. Referring particularly to FIGS. 5 through 7, it will be seen that the infeed chute comprises a pair of spaced parallel rails or bars 44, the upper edges of which furnish the fastener-engaging shoulders 32. The inner edges of the bottom wall plates 34a are welded or otherwise rigidly joined to the upper edges of the feed chute bars 44 along the outer or rear portions of the bars and plate, as shown. For reasons which will appear presently, the upper shoulder edges 32 of the feed chute bars 44 are stepped downwardly at 32a about midway along the bars, whereby the forward upper edge portions of these bars are spaced from the inner edges of the bottom wall plates 34a. Extending between the bottom wall plates 34a and the feed chute bars 44, within these forward, downwardly stepped regions of the bars, are oblique gusset plates 46. Gusset plates 46 are welded or otherwise rigidly joined to the sides of the feed chute bars 44, a distance below the upper shoulder edges 32 of these bars, and the undersurfaces of the bottom wall plates 34a, a distance outwardly of the inner plate edges, as shown in FIGS. 5 and 6. It is significant to note that in the normal upright driving position of the driving tool 10, the bottom wall portions or plates 34a of the bottom hopper wall 34 slope downwardly, laterally of the infeed guideway 30, toward the intervening infeed end of this guideway. The bottom wall portions or plates also slope downwardly, longitudinally of the infeed guideway, toward the infeed guide 22.

Extending across the interior of the infeed hopper 24, at the front end of this hopper, is a forward wall portion or plate 48. This forward wall portion or plate has a triangular shape and seats on top of the bottom wall plates 34a in a manner such that the forward plate is disposed at an oblique angle relative to the bottom wall plates. In FIG. 1, it will be observed that in the normal upright driving position of the driving tool 10, the forward plate 48 is generally horizontally disposed. The forward plate is welded or otherwise rigidly joined along its edges to the bottom wall plates 34a.

From the description to this point, it will be seen that the bottom of the fastener infeed hopper 24 is effectively furnished by the rear exposed portions of the bottom wall plates 34a and the front wall portion or plate 48. For convenience, the rear exposed portions of the bottom wall plates 34a will be hereinafter referred to simply as rear bottom wall portions 34a.

Extending across the top of the hopper 24, at the front end of the hopper, is a top wall 50. This top wall defines, with the hopper sidewalls 38, the front hopper end wall 40, and the front bottom wall portion 48, a rearwardly opening pocket or chamber 52. From the description of the infeed hopper 24 to this point, it is evident that owing to the compound lateral and fore-and-aft slope of the rear hopper bottom wall portions 34a, fasteners contained in the hopper tend to move forwardly in the hopper under the action of gravity and into the forward hopper chamber or pocket 52.

Mounted on the front hopper end wall 40 are pneumatic means 54 for blowing the fasteners rearwardly from the hopper chamber 52 to the rear end of the hopper 24. In this case, the pneumatic means 54 comprises an air manifold on the outer surface of the hopper wall 40. Opening forwardly from this manifold into the hopper chamber 52 are a number of airports or orifices 56. One end of the air manifold 54 provides an inlet 58 for connection to a source of air under pressure. From this description, it is evident that pressure air supplied to the manifold 54 issues in a series of jets through the manifold ports 56. These jets blow the fasteners rearwardly in the manifold, as mentioned. At this point, it is significant to recall that the illustrated fastener-driving tool 10 is pneumatically powered. A tool of this type has an air exhaust port through which air under pressure exhausts during each operating cycle of the tool. According to a feature of the present invention, the hopper manifold inlet 58 is connected to this tool air exhaust port through a tube or hose 60. Accordingly, the manifold 54 is supplied with air under pressure, to blow fasteners from the hopper chamber 52, during each operating cycle of the fastener driving tool 10.

The fasteners blown from the hopper chamber 52 to the rear end of the infeed hopper 24 slide inwardly along the sloping rear bottom wall portions 34a of the hopper 24 toward the intervening infeed opening 30a to the infeed guideway 30. Some of these fasteners enter the infeed opening, shank first, to positions wherein the heads of the fasteners rest on the inner edges of the rear bottom wall portions. Because of the fore-and-aft slope of these wall portions, the fasteners slide forwardly through the infeed guideway 30. Referring to FIG. 2, it will be observed that the rear bottom wall portions 34a are cut away, and the rear apex of the front bottom wall portion 48 is removed, to form an exit opening 62 in the bottom of the hopper 24 through which fasteners pass from the interior of the hopper to the portion of the infeed guideway 30 located externally of the hopper and below the front wall portion 48. This exit opening is made sufficiently large to pass the heads of the fasteners F.

According to a feature of the invention, the upper shoulder edges 32 of the feed chute bars 44 are stepped downwardly, just below the exit opening 62, as indicated at 32a in FIG. 1. The purpose of this step 32a in the shoulder edges 22 is to cause the fasteners F to drop as they emerge from the hopper 24 through its bottom exit opening 62 in such a way that the head of each emerging fastener drops into overlapping relation on top of the head of the preceding fastener, in the manner illustrated in FIG. 10. The fasteners then slide in this overlapping fashion downwardly along the feed chute 26 to the infeed guide 22. Preferably, an arcuate wall or tunnel 64 is mounted over the exterior portion of the feed chute 26 in order to retain the fasteners in proper position in the feed chute guideway 30 and thereby prevent jamming of the fasteners in the guideway.

Turning now particularly to FIGS. 1 through 4, it will be seen that the infeed guide 22 comprises a pair of abutting blocks or plates 66, 68. The adjacent front ends of the feed chute bars 44 are turned outwardly to form flanges 44a which seat against the outer surface of the guide block 66. The magnet 36, referred to earlier, is fixed within a recess in the outer surface of the opposite guide block 68. The feed chute 26 and the guide blocks 66, 68 are secured in assembled relation by bolts 70 which pass through the blocks and the feed chute bar flanges 44a and are threaded into bars 72 which seat against the outer surfaces of the flanges. Rigid on the upper ends of the bars 72 is a mounting plate 74 which is bolted or otherwise secured to the front end of the tool body 44. If desired, the mounting plate 74 may be formed with an integral depending portion 76 of channel configuration to provide a cover for the infeed guide magnet 36, as shown in FIG. 4. At this point, attention is directed to the fact that the guide blocks 66, 68 are constructed of a nonmagnetically permeable metal.

The inner contacting surfaces of the guide blocks 66, 68 are machined or otherwise formed with confronting recesses which define the infeed guide bore 28 when the blocks are assembled. As may be best observed in FIG. 4, this guide bore has a central cylindrical portion for receiving the heads of the fasteners F to be driven and diametrically opposed grooves for slidably receiving opposite longitudinal edges of the tool-driving spindle 16. These grooves are disposed in a plane normal to the longitudinal axis of the infeed guideway 30. As shown in FIG. 4, the outlet or exit end of this infeed guideway opens longitudinally through the infeed guide block 66 to the infeed guide bore 28, through the side of the bore diametrically opposite the infeed guide magnet 36. The communicating opening in the infeed guide block 66, between the infeed guide bore 28 and the infeed guideway 30, is formed with upwardly presented shoulders 78 for supporting the heads of the fasteners F during their movement from the infeed guideway to the infeed guide bore.

As each fastener F enters the infeed guide bore 28, it is attracted to the remote side of the bore by the infeed guide magnet 36. This magnet locates each entering fastener in a fixed driving position within the bore, wherein the upper head and lower tip of the bore seat against the wall of the bore diametrically opposite the infeed guideway 30. In this position, each fastener is disposed for proper driving engagement with the tool-driving spindle 16 during its forward driving stroke through the bore. Referring to FIG. 10, it will be seen that the driving spindle just clears the head of the following fastener F, thereby permitting the fastener F currently in driving position within the infeed guide bore 28 to be driven forwardly from this bore into the workpiece without interference from the following fastener. As soon as the driving spindle returns to its initial position following its driving stroke, the next fastener enters the infeed guide bore 28 and assumes its proper driving position in the bore, under the action of the infeed guide magnet 36.

FIG. 8 illustrates a modified fastener-locating magnet arrangement for the present fastener infeed device. In this case, the block 68 of the infeed guide 22 is replaced by a magnetic block 68a. The inner face of this block is recessed between its upper and lower ends to receive a ceramic or other nonmagnetically permeable insert 68b. The inner faces of the magnetic block 68a and the insert 68b are recessed, like the inner face of the block 68 in FIG. 4, to form one-half of the infeed guide bore 28.

FIG. 9 illustrates a further alternative arrangement of the infeed guide magnet. In this case, the infeed guide block 68 in FIG. 4 is replaced by a sheet metal plate 68b which is formed, in any convenient way, to the illustrated configurations so as to define one-half of the infeed guide bore 28 when assembled with the remaining infeed guide block 66. In this case, the infeed guide magnet 36b is secured to the outer surface of the guide plate 68b and is recessed to receive the outer bulge in the plate.

At this point, attention is directed to the fact that in each of the disclosed infeed guide magnet arrangements, the infeed guide magnet has a recess between its ends in order to provide the magnet with a generally horseshoe shape in vertical section. The vertical spacing between the two poles of the magnet is made substantially equal to the length of the fastener to be driven. This particular magnet arrangement is desirable for the reason that the head and tip of each fastener entering the infeed guide bore 28 are attracted to the two spaced poles of the magnet. The magnet thus serves to position each fastener longitudinally within the infeed guide bore.

FIG. 10 illustrates a modified, nonmagnet means 100 for locating each fastener F in driving position within the infeed guide bore. In this case, the locating means comprises a spring-loaded ball detent 102 which is urged to a normal position within the infeed guide bore to engage under the head of each fastener entering the bore. The detent is located diametrically opposite the infeed guide chute so as to cause each fastener to assume the same position in the guide bore as the earlier described magnetic fastener-locating means. It will be understood, of course, that when a fastener is driven forwardly from the infeed guide by the descending driving spindle 16 of the fastener-driving tool 10, the detent 102 is retracted against spring pressure to permit the fastener head to move past the detent.

FIGS. 11 through 14 illustrate a modified hopper configuration 200 according to the invention. In this case, the hopper has a bottom wall 202 including rectangular sloping wall portions or plates 204 located at opposite sides of and joined along their inner edges to the bars 206 of the infeed guide chute 208. The bottom wall plates 204 slope downwardly, laterally of the feed chute 208, toward the outer or rear infeed end of the feed chute 208. Referring to FIG. 11, it will be observed that the inner or front end of the feed chute 208 is inclined at an oblique angle relative to the rear end of the chute and extends upwardly through the space between the forward inner edge portions of the bottom wall plates 204. From this description, and from the drawings it will be understood that the outer or rear portions of the upper fastener head supporting shoulder edges 210 of the feed chute bars 206 are substantially flush with the inner edges of the bottom wall plates 204. The inner or front end portions of the feed chute bar edges 210, on the other hand, slope upwardly at an acute angle relative to the inner edges of the bottom wall plates 204.

Joined to the side, front and rear edges of the bottom wall plates 204 of the hopper 200 are sidewalls 212, a front wall 214, and a rear wall 216. The top of the hopper is closed by a hinged cover 218. The outer or rear edge of this cover is hinged to the upper edge of the rear hopper end wall 216, whereby gravity tends to retain the cover in its closed position of FIG. 11.

It will be observed that the bottom wall plates 204, sidewalls 212, and front wall 214 of the hopper 200 define, with the bars 206 of the infeed chute 208 a pair of tapered bins or chambers 220. These chambers are located at the front end of the hopper 200 and at opposite sides of the infeed chute 208. Because of the downward slope of the hopper 200, in the direction of its inner end, fasteners within the hopper tend to collect within the hopper bins or chambers 220.

Mounted on the front end wall 214 of the hopper 200 are pneumatic means 222 for blowing fasteners from the bins 220 to the rear upper end of the hopper. In this case, the pneumatic means comprises a manifold tube 224 from which extends a pair of nozzle tubes 226. These nozzle tubes have lower nozzle ends which open rearwardly to the front ends of the hopper bins 220. The inlet end of the manifold tube 224 is connected to the air exhaust opening of the fastener-driving tool, as explained earlier in connection with the embodiment of FIG. 1. From this description, it is evident that during each operating cycle of the driving tool, air under pressure is jetted from the nozzle tubes 226 into the front ends of the hopper bins 220. These air jets blow the fasteners from the bins to the upper rear end of the hopper 200. Some of the fasteners then slide laterally inward toward the infeed end of the feed chute 208 and enter the feed chute guideway, shank first, as in the earlier embodiment of the invention. The fasteners which enter the guideway then slide downwardly along the guideway to the driving tool, in much the same fashion as explained earlier in connection with the previous embodiment of the invention. In this regard, it will be observed in FIG. 14 that the front end wall 214 of the hopper 200 is slotted to receive the infeed chute 208 and is notched, above the feed chute, to provide an exit opening for the fasteners. This exit opening is dimensioned to pass the heads of the fasteners as the latter slide along the infeed chute bars 206 from the interior of the hopper 200 to the external portion of the feed chute 208 leading to the fastener-driving tool (not shown).

It will be understood that the inner or front end of the infeed chute 208 is secured to an infeed guide which, in turn, is attached to the front end of the fastener-driving tool, in the same manner as explained in connection with the earlier embodiments of the invention. Thus, the fasteners exiting from the hopper 200 along the infeed chute 208 enter the infeed guide and are located in driving position within the bore in the guide, as explained earlier. If desired, the external portion of the infeed chute 208 may be covered with an arcuate wall or tunnel similar to that described earlier in connection with FIG. 1.

What we claim in support of Letters Patent is:

1. A fastener infeed device for a fastener-driving tool having a body mounting a forward fastener driving spindle which is generally upright in the normal driving position of said tool, and means for driving said spindle in a reciprocating fastener driving motion involving alternate forward driving and rearward return strokes of the spindle, said device comprising:
   a guide having a bore, and means for securing said guide to the front end of said tool body in a position wherein said bore is coaxially disposed relative to said spindle, such that said spindle extends forwardly through said bore during each driving stroke and retracts rearwardly through said bore during each return stroke,
   a hopper displaced laterally from said bore for containing in bulk fashion a quantity of loose unattached headed fasteners,
   an infeed chute extending between and joined to said hopper and guide at an acute angle relative to said guide bore such that said infeed chute slopes downwardly tn the direction of said bore in the normal driving position of said tool,
   said infeed chute comprising a pair of spaced parallel rails with normally upper edges and defining an intervening infeed guideway having an infeed end opening laterally upward between said upper rail edges into said hopper and an exit end opening longitudinally through a side of said guide into said bore, and said hopper comprising a receptacle having a pair of bottom wall portions joined to said upper rail edges along the entire length of said guideway infeed end and extending outwardly and upwardly from said edges, and upstanding sidewalls joined to and rising from the outer edges of said bottom wall portions, whereby said guideway infeed end opens through the bottom of said hopper and the fasteners within said hopper gravitate along bottom wall portions toward and drop shank first into said guideway to positions wherein the fastener heads rest on said rail edges, and said fasteners then slide downwardly along said rail edges into said guide bore, and
   means carried by said guide to locate each fastener entering said guide bore in a fixed driving position within said bore.

2. A fastener infeed device according to claim 1 wherein:
said hopper has a front end adjacent said guide and a rear end remote from said guide, said guideway infeed end is located at the rear end of said hopper, said hopper has a rearwardly opening chamber at its front end, and said bottom wall portions slope downwardly longitudinally of said guideway toward said chamber when said tool occupies its normal driving position, whereby fasteners tend to gravitate into said chamber, and
pneumatic means for blowing fasteners rearwardly from said chamber to the rear end of said hopper for entry of said fasteners into the infeed end of said guideway.

3. A fastener infeed device according to claim 2 wherein:
said pneumatic means comprises a jet tube extending across the front end of said chamber having rearwardly opening ports and an inlet end for connection to a source of air under pressure.

4. A fastener infeed device according to claim 1 wherein:
said rail edges have a downward step forwardly of said guideway infeed end, whereby fasteners emerging from said hopper through said guideway assume contacting positions beyond said step wherein the head of each fastener overlaps the head of the preceding fastener.

5. A fastener infeed device according to claim 1 wherein:
said fastener-locating means comprises a generally horseshoe-shaped magnet along the side of said guide bore opposite said infeed chute having pole ends located in close proximity to and spaced along said bore for attracting the head and tip of each entering fastener to the adjacent side of said bore to retain each fastener in driving position in said bore.

6. A fastener infeed device according to claim 1 wherein:
said hopper has a front end adjacent said guide and a rear end remote from said guide, said guideway infeed end is located at the rear end of said hopper, said hopper has a rearwardly opening chamber at its front end, and said bottom wall portions slope downwardly longitudinally of said guideway toward said chamber when said tool occupies its normal driving position, whereby fasteners tend to gravitate into said chamber, and
means for blowing fasteners from said chamber to the rear end of said hopper for entry of said fasteners into the infeed end of said guideway, and
said rail edges have a downward step forwardly of said guideway infeed end, whereby fasteners emerging from said hopper through said guideway assume contacting positions beyond said step wherein the head of each fastener overlaps the head of the preceding fastener.

7. A fastener infeed device according to claim 6 wherein:
said fastener locating means comprises a generally horseshoe-shaped magnet along the side of said guide bore opposite said infeed chute having pole ends located in close proximity to and spaced along said bore for attracting the head and tip of each entering fastener to the adjacent side of said bore to retain each fastener in driving position in said bore.

8. A fastener driving tool comprising in combination:

a tool body, a fastener driving spindle extending from the front end of said body, means for driving said spindle in a reciprocating fastener-driving motion involving alternate forward driving and rearward return strokes of said spindle relative to said body, a guide secured to the front end of said body and having a bore coaxially disposed relative to said spindle, such that said spindle extends forwardly through said bore during each driving stroke and retracts rearwardly through said bore during each return stroke, a hopper displaced laterally from said bore for containing in bulk fashion a quantity of loose unattached headed fasteners, an infeed chute extending between and joined to said hopper and guide at an acute angle relative to the axis of said guide bore, such that said infeed chute slopes downwardly in the direction of said bore in a normal driving position of said tool, wherein said spindle is generally upright, said infeed chute comprising a pair of spaced parallel rails with normally upper edges and defining an intervening infeed guideway having an infeed end opening laterally upward between said upper rail edges into said hopper and an exit end opening longitudinally through a side of said guide into said guide bore, said hopper comprising a receptacle having a pair of bottom wall portions joined to said upper rail edges along the entire length of said guideway infeed end and extending outwardly and upwardly from said edges, and upstanding sidewalls joined to and rising from the outer edges of said bottom wall portions, whereby said guideway infeed end opens through the bottom of said hopper and fasteners within said hopper gravitate along bottom wall portions toward and drop shank first into the infeed end of said guideway to positions wherein the fastener heads rest on said rail edges and said fasteners then slide downwardly along said rail edges into said guide bore, and means carried by said guide to locate each fastener entering said guide bore in a fixed driving position within said bore.

9. A fastener-driving tool according to claim 8 wherein:

said hopper has a front end adjacent said guide and a rear end remote from said guide, said guideway infeed end is located at the rear end of said hopper, said hopper has a rearwardly opening chamber at its front end, and said bottom wall portions slope downwardly longitudinally of said guideway toward said chamber when said tool occupies its normal driving position, whereby fasteners tend to gravitate into said chamber, and pneumatic means for blowing fasteners rearwardly from said chamber to the rear of said hopper for entry into the infeed end of said guideway.

10. A fastener-driving tool according to claim 9 wherein:

said pneumatic means comprises a jet tube at the front end of said chamber having an inlet end for connection to a source of air under pressure.

11. A fastener-driving tool according to claim 8 wherein:

rail edges have a downward step forwardly of said guideway infeed end, whereby fasteners emerging from said hopper through said guideway assume contacting positions beyond said step wherein the head of each fastener overlaps the head of the preceding fastener.

12. A fastener-driving tool according to claim 8 wherein:

said fastener-locating means comprises a generally horseshoe-shaped magnet along the side of said guide bore opposite said infeed chute having pole ends located in close proximity to and spaced along said bore for attracting the head and tip of each entering fastener to the adjacent side of said bore to retain each fastener in driving position in said bore.

13. A fastener infeed device according to claim 2 wherein:

said hopper includes a bottom wall member within the front end of said hopper extending over said guideway forwardly of said guideway infeed end and disposed at an oblique angle relative to said bottom wall portions and a top wall member over said bottom wall member, and said wall members define therebetween said chamber.

14. A fastener infeed device according to claim 2 wherein:

said rails have rear portions bounding said guideway infeed end and front portions forwardly of said infeed end disposed at an oblique angle relative to said rear rail portions and rising above said hopper bottom wall portions, and said hopper includes a cover defining with said forward rail portions and bottom wall portions a said chamber at each side of said forward rail portions.

15. A fastener-driving tool according to claim 8 wherein:

said hopper includes a bottom wall member within the front end of said hopper extending over said guideway forwardly of said guideway infeed end and disposed at an oblique angle relative to said bottom wall portions and a top wall member over said bottom wall member, and said wall members define therebetween said chamber.

16. A fastener-driving tool according to claim 8 wherein:

said rails have rear portions bounding said guideway infeed end and front portions forwardly of said infeed end and disposed at an oblique angle relative to said rear rail portions and rising above said hopper bottom wall portions, and said hopper includes a cover defining with said forward rail portions and bottom wall portions a said chamber at each side of said forward rail portions.